MULTI-FREQUENCY SUPERVISORY SIGNAL RECEIVING SYSTEM
Filed Jan. 2, 1962
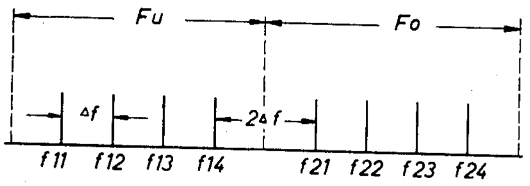
Fig.1
| Character | Frequencies |
|---|---|
| 1 | f 11 + f 21 |
| 2 | f 11 + f 22 |
| 3 | f 11 + f 23 |
| 4 | f 11 + f 24 |
| 5 | f 12 + f 21 |
| 6 | f 12 + f 22 |
| 7 | f 12 + f 23 |
| 8 | f 12 + f 24 |
| 9 | f 13 + f 21 |
| 10 | f 13 + f 22 |
| 11 | f 13 + f 23 |
| 12 | f 13 + f 24 |
| 13 | f 14 + f 21 |
| 14 | f 14 + f 22 |
| 15 | f 14 + f 23 |
| 16 | f 14 + f 24 |
Fig.2
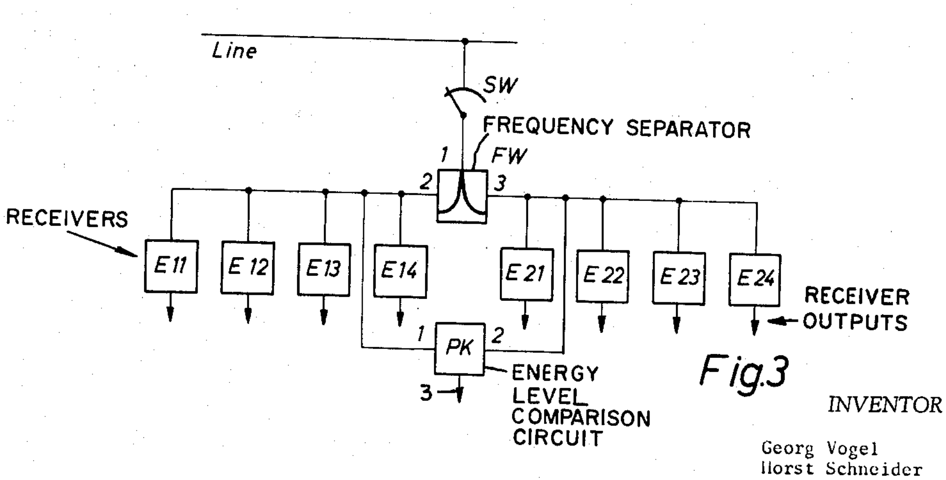
Fig.3
INVENTOR
Georg Vogel
Horst Schneider
Ernst Beyerle
BY Paul Hemminger
ATTORNEY 3,209,076
Patented Sept. 28, 1965

3,209,076

MULTI-FREQUENCY SUPERVISORY SIGNAL RECEIVING SYSTEM

Georg Vogel, Schwieberdingen, and Horst Schneider and Ernst Beyerle, Fellbach, Germany, assignors to International Standard Electric Corporation, New York, N.Y., a corporation of Delaware Filed Jan. 2, 1962, Ser. No. 163,687
Claims priority, application Germany, Jan. 7, 1961, St 17,314
3 Claims. (Cl. 179—84)

The present invention relates to a method of preventing faulty selections on account of speech influences during the voice-frequency code pushbutton selection carried out by a telephone subscriber.

In one conventional type of method the protection against faulty selections is achieved in that to each dial-character there is assigned an additional signal lying outside the speech band extending from 300 . . . 3400 c./s. At the exchange the dial-character receivers are only switched on by the evaluating circuit that serve to evaluate this additional signal. As an accompanying signal there has already been used the supply current of the station itself, which is either strongly reduced and/or subjected to a polarity reversal for the time duration of the signal transmission, or is momentarily interrupted at the beginning of the signal transmission. By way of these additional criteria switching means are caused to become effective at the exchange, and to switch on the dial-character receivers either for the entire signal duration or only for a certain predetermined period of time. All of these methods require a conversion of the accompanying signal whenever amplifiers are inserted into the subscriber's lines, or when carrier-frequency systems are employed on this level. In addition thereto these methods do not have a particularly high signalling speed, because the evaluation of the voice-frequency dial-characters is preceded by the transmission time and by the time required for evaluating the accompanying signal.

These disadvantages are eliminated by another proposed method in that as an accompanying signal there is used a frequency lying within the speech band, preferably, within the upper frequency range, which frequency is always blocked in the microphone circuit of the station, and is attached to each dial-character during the signal transmission. This requires no conversion of the accompanying signal in the case of amplified line circuits. This method is also quicker, because the receivers continuously remain to be connected. The evaluation is only effected if the frequency of the accompanying signal is received, which frequency, of course, can only come from the dial generator of the station. The additional expenditure at the station, however, is a higher one, because at least one resonant circuit is required for blocking the accompanying frequency, and for producing this frequency. The costs are still too high even if this resonant circuit is used for both purposes, as has already been proposed at an earlier date.

Additional signals accompanying the dial-character may be omitted when using receivers of the speech-immunity type. These receivers are blocked prior to the reception of speech, and are only responsive to the arrival of the pure dial-character.

There has already been proposed one method which employs receivers of the speech-immunity type. This method utilizes a special type of signal code and is characterized by the fact that several signal frequencies are available, but in which by each signal frequency, however, there are only constituted signals consisting of the three combinations of fundamental wave and first upper harmonic. The generation of the various signals is effected at the station in that a signal frequency is applied to the subscriber's line at random either directly, or via a half-wave or full-wave rectifier circuit. All receivers are connected to the line at the exchange via a low pass filter whose cut-off frequency is higher than the first upper harmonic of the highest signal frequency, and lower than the second upper harmonic of the lowest signal frequency. Each receiver is provided with a speech-immunity circuit which is adapted to block the receiver in the presence of frequencies which do not correspond to the own signal frequency. This speech-immunity circuit, however, is so designed as to be ineffective with respect to the corresponding first upper harmonic in the case of the fundamental wave receivers, and to be ineffective with respect to the corresponding fundamental wave in the case of the receivers of the first upper harmonic. In addition thereto the microphone of the station has to be switched off for the time duration of the signal transmission.

This proposed method provides a speech immunity without requiring an additional accompanying signal. Since the code also provides signals of only one frequency, and since the evaluation has to be performed very rapidly in order to achieve a high signalling speech, the speech immunity is not completely sufficient. In every speech there appear repeatedly short individual dominating frequencies which, in this particular case, may already lead to a faulty selection, because a momentary operation of only one receiver already causes the evaulating circuit to operate. As is well-known, the effect of the speech immunity is strongly increased when using signals composed of each time two frequencies.

It is the object of the present invention to provide a method employing signals consisting of two frequencies and which yet enables the use of receivers of the speech-immunity type, so that the protection against the speech influences is increased substantially. The method according to the present invention is characterized by the fact that the available frequency band is subdivided in the conventional manner into two partial frequency band (sub-bands), that the supervisory signals are respectively composed of the frequency of each partial frequency band, that all voice-frequency receivers are equipped with a speech-immunity circuit such as shown in U.S. Patent No. 2,698,878, which issued on June 4, 1955 and is assigned to the assignee of this invention. The receivers are connected to the line via a frequency-switching network (separating filter), in the course of which the frequencies of the upper partial frequency band are kept away from the receivers of the lower partial frequency band, and the frequencies of the lower partial frequency band are kept away from the receivers of the upper partial frequency band, and that the microphone of the station is switched off for the time of the signal transmission. The speech-immunity circuit of the receivers is so designed that the receivers are blocked in the case of frequencies which do not correspond to the own signal frequency. According to a further embodiment of the invention several signal frequencies, e.g. with an equal frequency spacing, are accommodated in each partial frequency band, and the two partial frequency ranges are separated from one another by providing a frequency spacing between the signal frequencies, this spacing being e.g. double as big as the frequency spacing between the two signal frequencies.

The speech immunity can still be increased by placing additional demands on the level of the signal frequencies. As is well-known, the energy content of the higher speech frequencies is reduced. For this reason it is provided by an appropriate further embodiment of the invention that the level of the signal frequencies is chosen thus that, at the receiving end, the level of the signal frequency within the upper partial frequency band is always greater than the level of the signal frequency within the lower partial frequency band. An evaluation of applied signals, in accordance with the present invention, is only performed after a special level-control device has determined that this level requirement has been adhered to. A still further embodiment of the invention provides that besides the two partial frequency bands with the signal frequencies, there is still formed a third partial frequency within the range of frequencies having the greatest speech energy content, and that the frequencies of this range have a particularly strong blocking effect upon the speech-immunity circuit of all signal receivers.

The invention will now be explained in detail with reference to FIGS. 1–3 of the accompanying drawings, in which:

FIG. 1 shows the frequency plan for the method,

FIG. 2 shows the selected signal code, and

FIG. 3 shows a block diagram of the receiving circuit.

As may be taken from FIG. 1 the frequency band for the signal frequencies is subdivided into two partial frequency ranges F*u* and F*o*. In each range there are accommodated e.g. four signal frequencies *f*11 . . . *f*14 and *f*21 . . . *f*24. The spacing between the signal frequencies is one range is constant and each time amounts to e.g. $\Delta f$. The highest signal frequency of the lower partial frequency range and the lowest signal frequency of the upper partial frequency range are appropriately positioned with a greater spacing between each other, such as $2\Delta f$. In this way it is possible to separate the two partial frequency ranges from one another with the aid of a relatively simple type of frequency-switching network (separating filter).

When selecting the signal code care has to be taken that from each partial frequency range each time only one frequency is used for constituting the signal. This is necessary in order that the receivers of the speech-immunity type of one partial frequency range are prevented from blocking each other. In FIG. 2 there is shown a code which, with the aid of respectively four signal frequencies in each partial frequency range, permits the formation of 16 signals. These signals are obtained when each signal frequency of the lower partial frequency range is combined with all signal frequencies of the upper partial frequency range. In the course of this there will always result signals with respectively one frequency in each partial frequency range, so that it will be possible to use receivers of the speech-immunity type. To this end, however, it is still necessary for the frequencies of the lower partial frequency range to be kept away or separated from the receivers of the upper partial frequency range, and for the frequencies of the upper partial frequency range to be kept away from the receivers of the lower partial frequency range.

FIG. 3 shows a receiving circuit according to the method of the invention. The receivers are connected in such a way that first of all, via a frequency-switching network (separating filter) FW, the partial frequency ranges are separated and applied to the receivers E11 . . . E14 and E21 . . . E24 which are combined to groups. Upon application, or in the presence of a dial or selecting signal, each time one frequency only will reach the groups of receivers. In each group there will respond the associated receiver, and at the same time the remaining receivers of the groups are blocked. The frequency-switching network FW is so dimensioned that from the input 1 to the output 2 there are only admitted the frequencies of the lower partial frequency band, and that to the output 3 there are only admitted the frequencies of the upper partial frequency band. For this reason the receivers E11 . . . E14 are connected to the output 2, and the receivers E21 . . . E24 are connected to the output 3. For example, when transmitting the signal 3 with the frequencies *f*11, *f*23 then the receiver E11 will respond in the one group, whereas the receivers E12, E13 and E14 are blocked by the frequency *f*11, and in the other group the receiver E23 will respond by simultaneously causing the blocking of the receivers E21, E22 and E24.

To the outputs 2 and 3 of the frequency-switching network there are connected the inputs 1 and 2 of a comparison means such as a level-control device PK. Device PK provides a signal at its output 3 only when the energy level of the signal at its input 2 is greater than the energy level of the signal at its input 1. This arrangement serves to supervise the level conditions of the applied dial-characters, and only responds if the input level at the input 2 of device PK is higher than at the input 1 of device PK. A dial-character is only presented if also this requirement is also met, because the signal levels are chosen thus, that the receiving level of the signal frequencies within the upper partial frequency band is always higher than the level, of the signal frequencies within the lower partial frequency band. By choosing the level in this way there is effected an increase of the speech immunity, because in speech the conditions are just opposite. It is a well-known fact that the higher speech frequencies have a smaller energy content.

A further step towards increasing the speech immunity may be taken in that, besides the two partial frequency ranges with signal frequencies, there is still formed a third partial frequency range within the frequency range of the higher energy contents, and in that this range serving all signal receivers, is only included into the speech-immunity circuit. The frequencies of this third range may have a particularly strong blocking effect, because they are not involved in the signal transmission. In this case the frequency-switching network arranged in the receiving circuit is to be laid out in such a way that the frequencies of this additional or third range are permitted to be applied from the input 1 to the outputs 2 and 3. If necessary, an additional amplifier may still be inserted into this path within the frequency-switching (or dividing) network.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. A communications receiving system providing speech immunity for voice-frequency supervisory signals wherein each of said signals comprises an upper frequency band component and a lower frequency band component, said system comprising automatic switching means for connecting said system to line means carrying said signals, frequency separating means connected to said switching means for separating said received signal into its upper and lower frequency band components, said frequency separating means having a first output composed of upper frequency band components and a second output composed of lower frequency band components, comparison means connected to both said first and second outputs for comparing the energy content of said outputs and including means actuated to enable evaluation of said received signal only when the energy content of said first output is greater than the energy content of said second output.

2. In the system of claim 1 and a first group of receivers connected to said first output, a second group of receivers connected to said second output, each of said receivers in said first group are operated responsive to a particular frequency in said upper frequency band and blocked by all other frequencies and wherein each of said receivers in said second group are operated responsive to a particular frequency in said lower frequency band and blocked by all other frequencies.

3. In the voice frequency system of claim 1 wherein a first group of receivers is connected to said first output, a second group of receivers is connected to said second output and each of said receivers are equipped with speech-immunity circuits.

References Cited by the Examiner

UNITED STATES PATENTS

| | | | |
|---|---|---|---|
| 2,265,203 | 12/41 | Six | 179—84 |
| 2,535,104 | 12/50 | Van Mierlo | 179—84 |
| 3,057,964 | 10/62 | Power | 179—84 |
| 3,076,059 | 1/63 | Meacham et al. | 179—84 |
| 3,128,349 | 4/64 | Beosch et al. | 179—84 |

FOREIGN PATENTS

| | | |
|---|---|---|
| 854,375 | 11/60 | Great Britain. |

OTHER REFERENCES

Electrical Engineering: "Vibrating Reed Selective Signaling System," p. 927, November 1949.

ROBERT H. ROSE, *Primary Examiner.*